United States Patent [19]

Burns

[11] Patent Number: 4,674,117

[45] Date of Patent: Jun. 16, 1987

[54] SUBSCRIBER LINE CIRCUIT HAVING AN IMPROVED OFFHOOK SUPERVISION CIRCUIT

[75] Inventor: Robert V. Burns, Phoenix, Ariz.

[73] Assignee: GTE Communication Systems Corporation, Phoenix, Ariz.

[21] Appl. No.: 770,465

[22] Filed: Aug. 29, 1985

[51] Int. Cl.[4] ............................................. H04M 3/22
[52] U.S. Cl. ...................................... 379/377; 379/350
[58] Field of Search .......... 179/18 FA, 16 AA, 16 A, 179/16 F, 81 R; 379/350, 377, 378, 379, 380, 381, 382, 383, 384, 385

[56] References Cited

U.S. PATENT DOCUMENTS

| | | | |
|---|---|---|---|
| 4,281,219 | 7/1981 | Cowpland et al. | 379/382 |
| 4,317,964 | 3/1982 | Biggs et al. | 379/379 |
| 4,326,104 | 4/1982 | Bergida | 379/379 |
| 4,525,603 | 6/1985 | Bond | 379/81 |
| 4,540,853 | 9/1985 | Albouy | 379/378 |
| 4,540,854 | 9/1985 | Beirne | 379/345 |

Primary Examiner—Gene Z. Rubinson
Assistant Examiner—R. Vaas
Attorney, Agent, or Firm—Anthony Miologos; Peter Xiarhos

[57] ABSTRACT

An improved offhook supervision circuit including an amplifier connected to a subscriber loop through the tip and ring conductors of a subscriber line circuit. The amplifier is arranged to develop and output a loop voltage signal representing the level of the DC signals applied to the subscriber loop circuit. A comparator device has a first input connected to the amplifier and is arranged to receive the loop voltage signal output by the amplifier. A second input of the comparator device is connected to a reference voltage device which outputs a predetermined reference signal voltage. Any significant reduction of the DC signal level on the loop circuit will cause the loop signal voltage output by the amplifier to fall below the reference signal voltage. An offhook signal is then output from the comparator device to a control device signaling an offhook condition.

7 Claims, 1 Drawing Figure

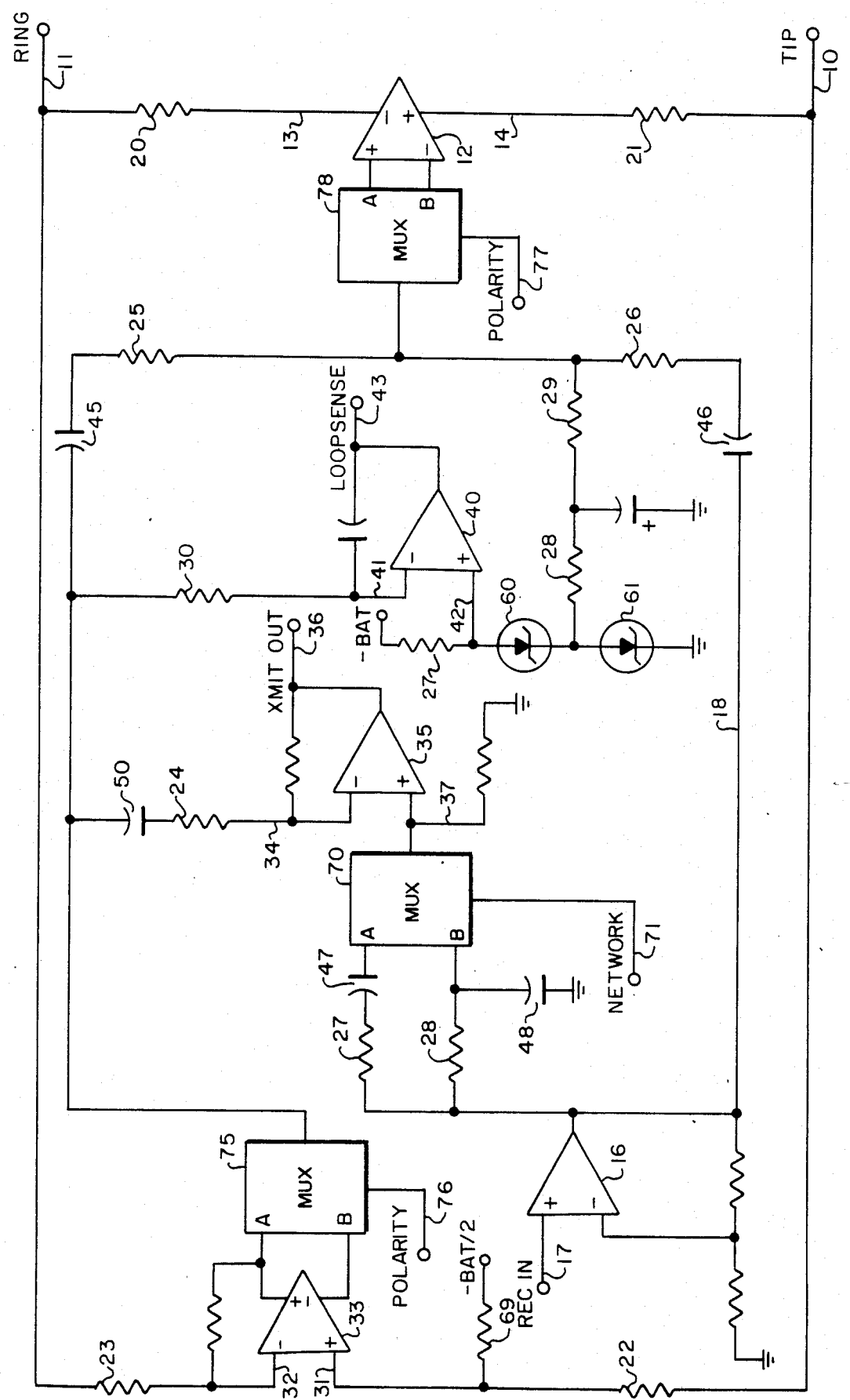

2

SUBSCRIBER LINE CIRCUIT HAVING AN IMPROVED OFFHOOK SUPERVISION CIRCUIT

CROSS-REFERENCE TO RELATED APPLICATIONS

The present application is related to co-pending U.S. patent application Ser. No. 770467, titled "A Subscriber Line Circuit Having Improved AC Matching", and U.S. patent application Ser. No. 770466, titled "A Subscriber Line Circuit Having An Improved Loop Current Supply Circuit", each having the same inventive entity and each being assigned to the same assignee.

BACKGROUND OF THE INVENTION

This invention relates in general to solid state analog subscriber line circuits used in telecommunication systems and more particularly to a solid state analog subscriber line circuit having an improved performance capabilities and including an improved offhook supervision circuit.

Traditionally subscriber line circuits have used inductive type battery feed circuits. These circuits provide excellent performance and low cost but their characteristic components require large amounts of space and have great weight.

Analog line circuits which use lighter and smaller solid state components are finding increased usage in the telecommunications industry today. However, these circuits do not provide performance equal to the inductive line circuits of the past. One of the great disadvantages to the presently known solid state analog line circuits is their inability to function in the presence of high longitudinal voltages and currents on the tip and ring leads of the line circuit.

One technique presently known for overcoming the above mentioned shortcomings is the use of a small transformer and associated circuitry which cancels any magnetic flux in the transformer produced by the loop current. This technique finds disadvantage in that it provides inferior performance relative to a larger transformer and it consumes additional power in the flux cancellation winding of the transformer.

It also becomes necessary in a subscriber line circuit to be able to sense when a subscriber has gone offhook and signal the offhook condition to common control equipment.

It therefor becomes an object of the present invention to provide a solid state analog line circuit which exhibits performance superior to an inductive line circuit and employing an improved offhook supervision circuit.

SUMMARY OF THE INVENTION

In accomplishing the object of the present invention there is provided a subscriber line circuit having a tip conductor and a ring conductor connected to a subscriber loop circuit. The improved offhook supervision circuit of the present invention includes amplifier means having a first input connected to the tip conductor and a second input connected to the ring conductor. The first amplifier is arranged to develop and output a loop signal voltage representing the voltage level of the AC and DC signals applied to the tip and ring conductors from said subscriber loop circuit.

The subscriber line circuit further includes comparator means having first and second inputs. The first input is connected to the first amplifier means and is arranged to receive the first amplifier means output signal. The second input of the comparator means is connected to a reference signal means. The reference signal means supplies the comparator means with a reference signal voltage having a predetermined level.

The comparator means outputs an offhook signal in response to a sufficient drop in the level of DC signals on the subscriber loop. A significant reduction of the DC signal level on the loop circuit will cause the loop signal voltage output by the amplifier means to fall below the reference signal voltage. The offhook signal is then output from the comparator means to a common control device thereby signaling an offhook condition.

A BRIEF DESCRIPTION OF THE DRAWINGS

The single sheet of drawings included herewith comprise a schematic diagram of a subscriber line circuit having an improved offhook supervision circuit embodying the principles of operation of the present invention.

DESCRIPTION OF THE PREFERRED EMBODIMENT

Turning now to the single sheet of the included drawings, the present invention is shown connected to a subscriber loop circuit via a pair of loop conductors. A tip conductor labeled 10 and the ring conductor labeled 11. Loop conductors 10, 11 are driven by buffer amplifier 12 which is comprised of a unity gain differential output amplifier. The inverting output 13 of buffer amplifier 12 drives the ring conductor 11 thru resistor 20. The non-inverting output 14 of buffer amplifier 12 drives the tip conductor 10 thru resistor 21. Buffer amplifier 12 serves to supply DC loop current as well as AC RECV signals to the loop.

Signals to be output to the subscriber loop circuit are applied first to the RECV IN lead 17 and the non-inverting input of buffer amplifier 16 and then via lead 18 to buffer amplifier 12 and the tip and ring conductors 10, 11 respectively. These signals are transported across the subscriber loop to a subscriber instrument and applied to the receiver.

XMIT signals from a subscriber instrument transmitter are sent over the subscriber loop and appear at the tip and ring conductors 10 and 11 respectively. The XMIT signals appearing at the tip conductor 10 are applied to the non-inverting input 31 of differential amplifier 33 via resistor 22. Likewise the XMIT signal appearing on the ring conductor 11 is applied to the inverting input 32 of amplifier 33 via resistor 23. The output of amplifier 33 is sent to the inverting input of amplifier 35 via capacitor 50 and resistor 24. The received XMIT signal is output via the XMIT OUT lead 36.

RECV signals applied to the tip and ring conductors 10, 11 by amplifier 16 and buffer amplifier 12 also appear at the input of amplifier 35. In order to prevent these signals from reaching the XMIT OUT lead 36 RECV signals from the output of amplifier 16 are also applied to the non-inverting input 37 of amplifier 35. The RECV signals than cancel at the output of amplifier 35.

For applications requiring two or more balancing networks multiplexer 70 selects the desired network from a first resistor capacitor combination comprising of resistor 27 and capacitor 47, and a second resistor capacitor combination comprising resistor 28 and capacitor 48. A network enable lead 71 toggles multiplexer 70 and switches in the selected network.

DC loop current is supplied to the ring and tip conductors 10, 11 by applying a DC bias voltage to the input of buffer amplifier 12. The bias voltage is applied to the input of buffer amplifier 12 from the negative battery input though a network consisting of resistor 27, zener diodes 60, 61 and resistors 28, 29. The voltage drop across zener diode 61 insures that the bias voltage will be a fixed voltage below the supply voltage. The bias voltage is required to be sufficiently below the supply voltages powering buffer amplifier 12 in order to allow adequate AC signal swing at the output of buffer amplifier 12.

Normally, the DC battery feed resistance of the line circuit is lower than the AC impedance of the loop circuit. In order to provide proper impedance matching with the loop circuit, the present invention uses internal feedback to achieve any desired AC impedance of tip and ring.

AC signals appearing at the tip and ring conductors 10 and 11 are transported and applied to amplifier 33. The output of amplifier 33 is passed to amplifier 12 via a divider network consisting of resistor 25, capacitor 45 and resistor 26, capacitor 46. The feedback signal applied to buffer amplifier 12 from amplifier 33 is in phase with the signal appearing at the tip and ring conductors 10, 11. The input signal applied is thus reinforced and raises the impedance seen by the tip and ring conductors above the DC value of resistors 20 and 21.

Longitudinal signals induced by power lines into the subscriber loop and appearing at the tip and ring conductors 10, 11 are cancelled out by the common mode rejection of buffer amplifier 33 and therefore do not appear at the XMIT OUT lead 36 of amplifier 35. In order to insure that the all longitudinal signals are cancelled by amplifier 33 the tip and ring impedances must be equal and therefore the gains of the two inputs 31, 32 of amplifier 33 must be equal. The level of longitudinal signals which can be cancelled by the invention is determined by the ability of buffer amplifier 12 to sink equal amounts of current without becoming non-linear, and the ability of amplifier 33 to maintain equal gains at its inputs as the longitudinal voltage increases.

It therefor becomes necessary that the resistors 20 and 21 be matched as close as possible. Slight mismatches can be compensated for in the invention by adjusting the gain balance of amplifier 33. In order to provide for extremely high rejection of longitudinal signals, resistor 69 may be adjusted to compensate for other circuit components which may effect longitudinal balance and rejection.

Polarity reversal of the tip and ring conductors is accomplished by multiplexers 75 and 78 which select the inverting output of amplifier 33 and the non-inverting input of buffer amplifier 12 when enabled via enabling signals applied to the network leads 76 and 77 respectively from common control equipment (not shown).

Offhook supervision is provided by a network comprising comparator 40, resistor 30 connected to the output of amplifier 33 on one end and to the inverting input 41 of comparator 40 on an other end and a non-inverting input 42 connected to the negative battery source, resistor 27 and zener diodes 60 and 61. Zener diodes 60 and 61 develop and apply to input 42 a reference voltage.

In operation, the comparator 40 inverting input 41, senses the ring/tip DC voltage output by amplifier 33. When the voltage drops below a reference voltage applied to the non-inverting input 42 due to a drop in loop voltage, comparator 40 will then develop a LOOP SENSE signal which is output via lead 43 to the common control equipment (not shown). Thereby, indicating the presence of an offhook condition in the loop circuit.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a subscriber line circuit having a tip conductor and a ring conductor connected to a subscriber loop circuit, an improved offhook supervision arrangement comprising:

amplifier means including a first input connected to said tip conductor and a second input connected to said ring conductor, said amplifier means arranged to develop and output a signal representative of the level of DC signals applied to said tip and ring conductors from said subscriber loop circuit over a first and a second output;

selection means including a first and a second input connected to said amplifier means first and second outputs respectively, said selection means including an output and an enabling lead, said selection means arranged to connect said amplifier means first output or alternatively said second output to said selection means output responsive to signals sent to said enabling lead;

comparator means having first and second inputs, said first input connected to said selection means output and arranged to receive said first amplifier means output signal; and, reference means connected to said comparator means second input supplying said comparator means a reference signal having a predetermined level whereby, said comparator means outputs a signal responsive to the level of DC signals applied to said subscriber loop falling below the level of said reference means signal.

2. The subscriber line circuit as claimed in claim 1, wherein: said amplifier means comprises a unity gain differential output amplifier having a first non-inverting input connected to said tip conductor and a second inverting input connected to said ring conductor, and said first output of said unity gain differential output amplifier comprises a non-inverting output and said second output comprises an inverting output and said non-inverting and inverting outputs are connected to said first and second inputs respectively of said selection means.

3. The subscriber line circuit as claimed in claim 2, wherein: said comparator means comprises an operational amplifier and said first input comprises an inverting input connected to said selection means output and said second input comprises a non-inverting input connected to said reference means.

4. The subscriber line circuit as claimed in claim 3, wherein: said reference means comprises a reference voltage network including a source of negative battery potential, a resistor and first and second zener diodes, said operational amplifier non-inverting input is connected to said reference voltage network intermediate said resistor and first zener diode whereby, said reference voltage network supplies said operational amplifier non-inverting input a set voltage threshold level.

5. The subscriber line circuit as claimed in claim 2, wherein: said selection means comprises a multiplexer and said enabling lead is connected to common control equipment whereby, responsive to the polarity of said AC signals applied to said tip and ring conductors, said enabling lead receives a signal connecting said unity gain differential output amplifiers non-inverting or alternatively said inverting input to said multiplexer input and said comparator means.

6. The subscriber line circuit as claimed in claim 4, wherein: said operational amplifier includes an output lead connected to common control equipment whereby, said operational amplifier outputs a signal to said common control equipment responsive to the level of DC signals applied to said subscriber loop falling below the threshold level set by said reference voltage network.

7. In a subscriber line circuit having a tip conductor and a ring conductor connected to a subscriber loop circuit, an improved offhook supervision arrangement comprising:

amplifier means including a first input connected to said tip conductor and a second input connected to said ring conductor, said first amplifier arranged to output a loop signal voltage representative of the voltage level of the DC signals applied to said tip and ring conductors from said subscriber loop circuit over a first non-inverting output and a second inverting output;

selection means including a first and a second input connected to said amplifier means first non-inverting output and second inverting output respectively, said selection means including an output and an enabling lead, said selection means arranged to connect said amplifier means first non-inverting output or alternatively said amplifier means second inverting output to said selection means output responsive signals sent to said enabling lead from common control equipment;

comparator means having an inverting and a non-inverting input, said inverting input connected to said selection means output and arranged to receive said loop signal voltage; and reference voltage means connected to said comparator means non-inverting input supplying said comparator means a reference voltage having a predetermined level whereby, said comparator means outputs a signal to common control equipment responsive to said loop signal voltage falling below said reference voltage.

* * * * *